INVENTORS: J. A. COLLINSON
J. S. COOK
M. SUBRAMANIAN

ATTORNEY

Nov. 17, 1970    J. A. COLLINSON ET AL    3,540,829
LASER DETECTION OF CLEAR AIR TURBULENCE
Filed Sept. 9, 1968    3 Sheets-Sheet 2

United States Patent Office 3,540,829
Patented Nov. 17, 1970

1

3,540,829
LASER DETECTION OF CLEAR AIR TURBULENCE
James A. Collinson, Mountain Lakes, John S. Cook, New Providence, and Mahadevan Subramanian, Whippany, N.J., assignors to Bell Telephone Laboratories, Incorporated, Murray Hill, N.J., a corporation of New York
Filed Sept. 9, 1968, Ser. No. 758,314
Int. Cl. G01m 21/46
U.S. Cl. 356—129                 6 Claims

ABSTRACT OF THE DISCLOSURE

A laser transmitter transmits a laser beam through the atmosphere. When passing through clear air turbulence (CAT), the beam is modulated by fluctuations in the atmosphere's refractive index coefficient. The degree of modulation is related to the degree of turbulence. Receiving and processing apparatus responds to a portion of the beam and produces an indication of the degree of modulation.

BACKGROUND OF THE INVENTION

Field of the invention

This invention relates to systems for producing advance warnings of air turbulences so that evasive action may be taken by aircraft.

Description of the prior art

Shortly after swept-wing jet aircraft started flying on a regular basis, reports were received of damage-producing encounters with a type of turbulence now referred to as "clear air turbulence" (CAT). Such turbulence is an atmospheric phenomenon which apparently can be produced by any one of a number of conditions. Studies have shown that these disturbances may be extremely severe, may occur over 40,000 feet of altitude and may change substantially in position or intensity within the matter of hours. Furthermore, they are invisible to the human eye and primarily undetectable by weather radar systems.

Various programs were started to overcome the CAT problem. One program involves the briefing of pilots as to the areas where such turbulences are prevalent and what to do when one is encountered. Another program contemplates the use of autopilots engineered to react favorably when such a turbulence is encountered. Still other programs contemplate early warning by radar and laser systems that rely on backscatter from turbulent areas. Finally, infrared systems have been proposed to produce early warning by detecting temperature gradients produced by turbulent areas. To the best of applicants' knowledge, however, a practical system has not been produced.

SUMMARY OF THE INVENTION

An object of the invention is to detect, at a distance, atmospheric turbulences and, in particular, clear air turbulences.

This and other objects are achieved by first transmitting a laser beam through the portion of the atmosphere under test. The presence of turbulence within the traversed atmosphere causes a fluctuation of the atmosphere's refractive index coefficient which, in turn, modulates the laser beam by destroying some of the coherent characteristic of the beam. When detected, this modulation results in a voltage fluctuation whose frequency dispersions depends on the degree of turbulence present in the atmosphere; that is, the more severe the turbulence, the greater the dispersion.

After passing through the atmosphere under test, a portion of the beam is received, detected and operated upon to produce an indication of its frequency dispersion. In accordance with the invention, an indication of the dispersion may be in the form of a voltage whose amplitude is linearly related to the slope of the logarithm of the power spectral density of the detected portion of the beam. Such a voltage is produced in one embodiment of the invention by applying the detected signal to a pair of narrow bandpass filters having frequency displaced passbands and then applying the outputs of these filters to a ratio detector whose output, in turn, is the desired voltage.

Embodiments of the invention may be dispersed and thereby used in a number of ways. For example, beam transmission may be between aircraft and ground based reflectors. Beam transmission may also be between a ground based transmitter-receiver and a reflecting satellite so that a particular portion of the atmosphere is repeatedly inspected for turbulences.

Other objects and features of the invention are discussed in greater detail in the following detailed description.

DESCRIPTION OF THE DISCLOSED EMBODIMENT

Figure 1:
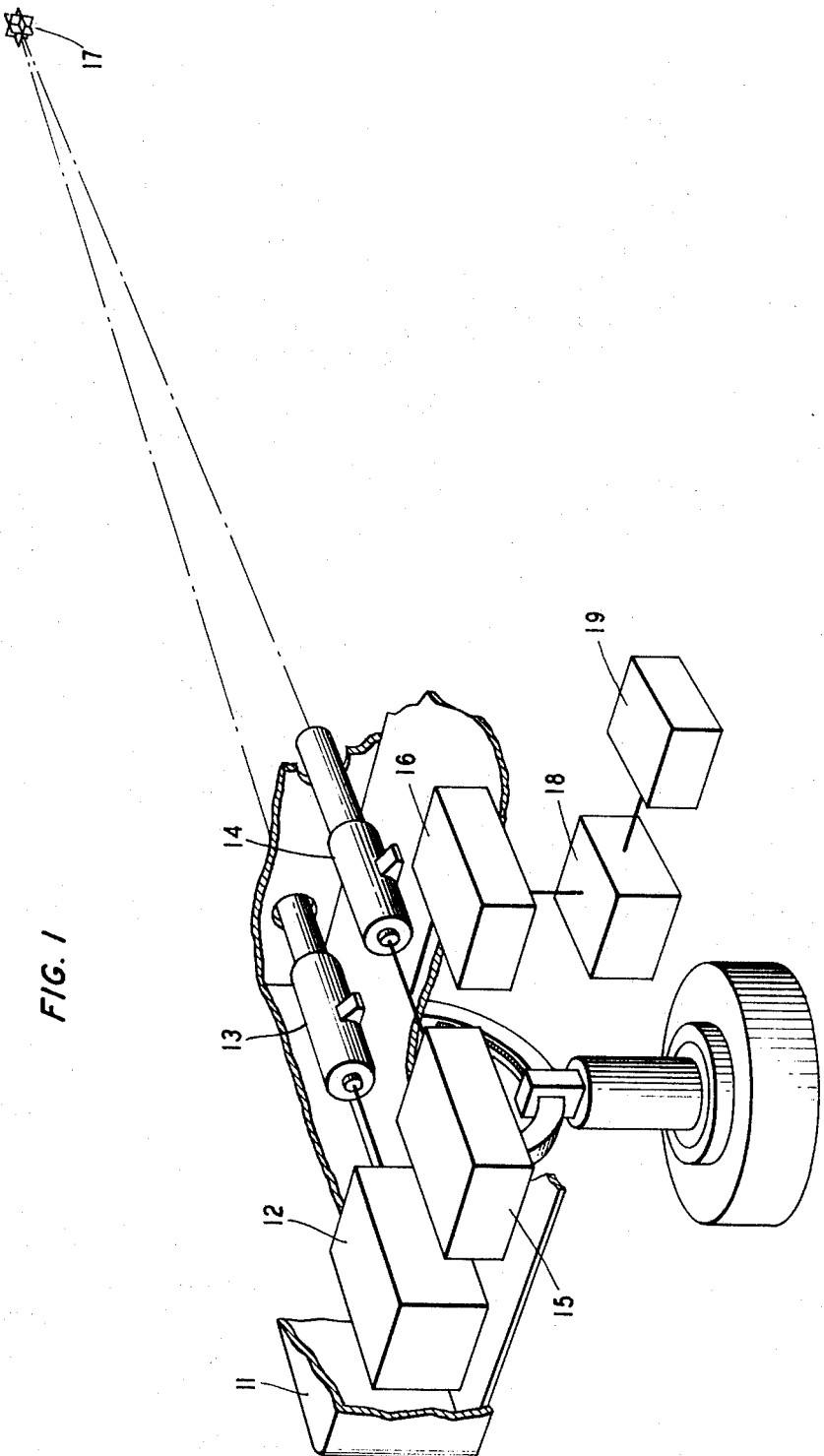
FIG. 1 is a pictorial-block diagram of one embodiment of the invention.

The embodiment of FIG. 1 includes a tracker assembly 11 in which is mounted a laser source 12 optically coupled to a transmitting telescope 13. Also mounted in tracker assembly 11 is a receiving telescope 14 whose output is optically applied to an optical tracker control 15 and a photo detector 16.

To the right of tracker assembly 11 and at some distance therefrom (as, for example, 10 or more miles) is a corner reflector assembly 17. Optical tracker control 15 drives tracker assembly 11 to keep the telescopes directed at reflector assembly 17 whenever there is any relative motion between the tracker and reflector assemblies.

All of the apparatus mentioned thus far is conventional and well known in the art.

In operation, tracker assembly 11 is oriented so that laser source 12 and telescope 13 transmit a laser beam that illuminates reflector assembly 17. Because of the nature of the corner reflector assembly 17, a portion of the laser beam is reflected back toward tracker assembly 11. A portion of this reflected beam is intercepted by receiving telescope 14. Optical tracker control 15 responds to the output of telescope 14 to cause reflector assembly 17 to be tracked in a manner well known to those skilled in the art.

When turbulence is present in the atmosphere between tracker and reflector assemblies 11 and 17, a fluctuation of the atmosphere's refractive index coefficient occurs. This coefficient fluctuation destroys some of the coherent character of the laser beam to produce modulation. It has been found that the greater the turbulence, the greater the frequency dispersion of the detected laser beam power. Photo detector 16 responds to the received beam to produce a frequency dispersed electrical output representing the modulation. The degree of dispersion is measured by a dispersion detector 18 connected to receive the output of photo detector 16. An indicator 19, in turn, registers the output of dispersion detector 18.

Dispersion detector 18 may operate on any one of several principles. It may, for example, measure the frequency bandwidth of the output from photo detector 16 as this bandwidth (which is the same as that of the aforementioned modulation) is directly related to the degree of turbulence. In accordance with the invention, however, it is preferred to measure the dispersion by using the voltage spectral density of the output of photo detector 16. In particular, it has been found that when the voltage spectral density is plotted on a logarithmic scale and frequency on a linear scale, a straight line may be drawn through the voltage and frequency intercepts as shown by line 20 in FIG. 2. The slope of this line is inversely related to the frequency dispersion. Furthermore, the equation for the line is:

$$V_f = ke^{-\alpha f}$$

where:

$V_f$ = voltage,
$f$ = frequency,
$k$ = a constant and
$\alpha$ = a measure of the slope of line 20.

Figure 2:
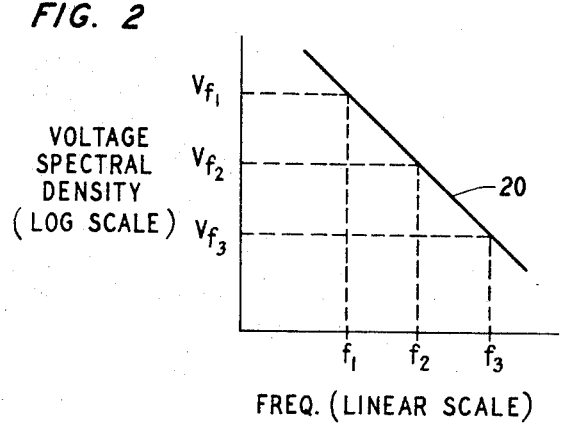
FIG. 2 is a chart used in discussing the embodiment.

The constant $k$ may be eliminated so that only one unknown, namely $\alpha$, is left by considering $V_f$ at two frequencies as follows:

$$\frac{V_{f_1}}{V_{f_2}} = e^{\alpha(f_2 - f_1)} = e^{\alpha f_0} \quad (2)$$

where the subscripts correspond to those used in FIG. 2 and $f_0 = f_2 - f_1$.

Figure 3:
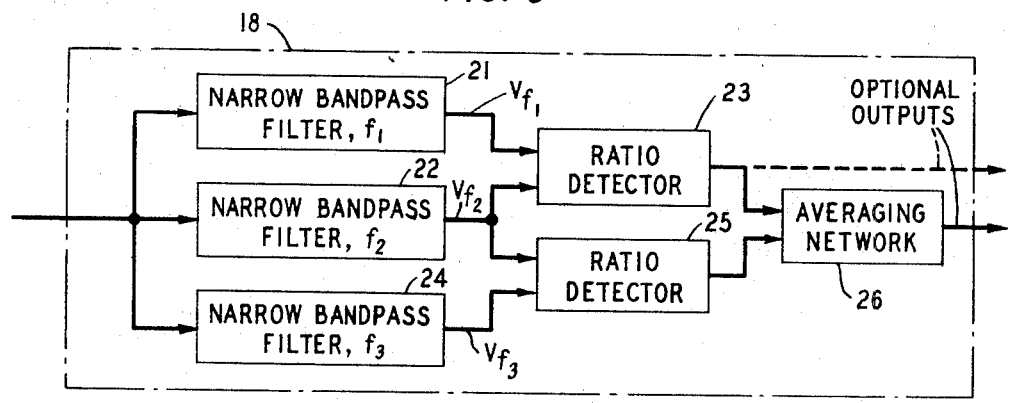
FIG. 3 is a block diagram of a dispersion detector for practicing the invention.

A voltage equal to the right hand side of Equation 2 is produced by narrow bandpass filters 21 and 22 and a ratio detector 23 of the dispersion detector shown in FIG. 3. In particular, filters 21 and 22 derive voltages $V_{f_1}$ and $V_{f_2}$ (at frequencies $f_1$ and $f_2$), respectively, from the output of photo detector 16 and apply these two voltages to ratio detector 23. Since the values of $e$ and $f_0$ are fixed, any changes in the output of ratio detector 23 represent a change in the value of $\alpha$ which is related to the slope of line 20.

When the value produced by ratio detector 23 is not sufficiently accurate, better accuracy may be obtained by repeating the above described operation for a different portion of line 20 and averaging the two values. This is done in FIG. 3 by using a narrow bandpass filter 24 to derive a voltage $V_{f_3}$ at frequency $f_3$ where $f_3 - f_2 = f_0$. Voltage $V_{f_2}$ and $V_{f_3}$ are then applied to a ratio detector 25 whose output ideally is the same as that shown on the right hand side of Equation 2. The average value of the ratio detector outputs is produced by an averaging network 26.

It may be desirable in some applications to include a threshold sensitive circuit in indicator 19 so that only outputs produced by large disturbances are indicated.

Figure 4:
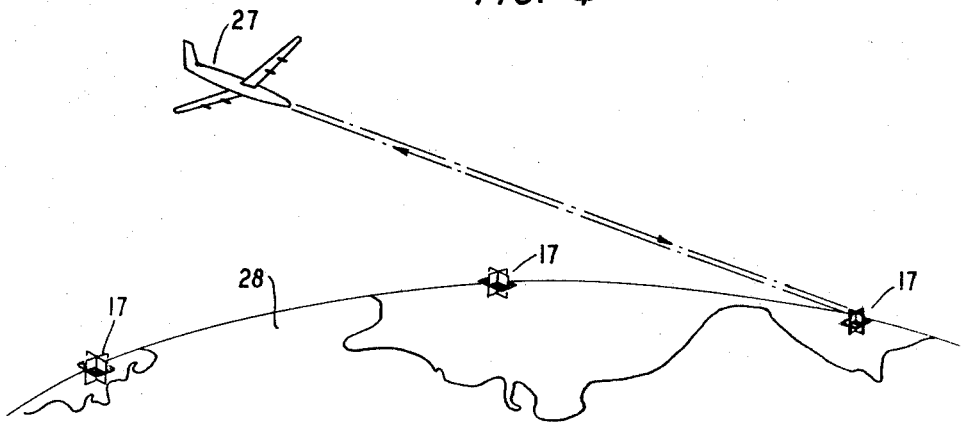
FIGS. 4 and 5 show several ways in which embodiments of the invention may be used.

As mentioned earlier, embodiments of this invention may be dispersed and used in different ways. FIG. 4 shows one such arrangement in which tracker assembly 11, dispersion detector 18 and indicator 19 of FIG. 1 are all located in an aircraft 27 and a plurality of reflector assemblies 17 of FIG. 1 are placed on the earth's surface 28, such as on mountain peaks, below the intended flight path of the aircraft. Transmission is of course from the aircraft to a reflector assembly and back to the aircraft. In this arrangement, it will be noted that the beam passes through the atmosphere below the aircraft's flight altitude. Since clear air turbulences occupy large volumes with significant altitudes, a pilot would be well advised to seek a different path if he detected a disturbance in his present path but at a lower altitude.

Figure 5:
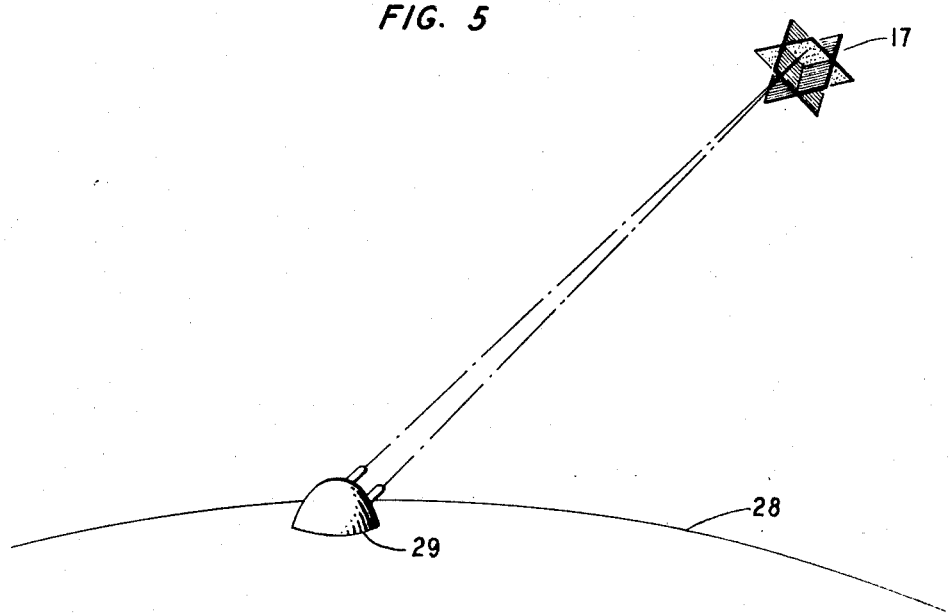

FIG. 5 shows another arrangement and way in which the invention may be used. This application of the invention is particularly useful in areas where CAT is prevalent. In FIG. 5, tracker assembly 11, dispersion detector 18 and indicator 19 of FIG. 1 are all located in a ground station 29 on the earth's surface 28. Reflector subassembly 17 of FIG. 1 is shown in FIG. 5 as being in a retrograde near-polar orbit so that it passes substantially over station 29 during each orbit about the earth. A larger part of the atmosphere above and to both sides of station 29 may thus be inspected for CAT's with each orbit of reflector assembly 17. More than one satellite, each with a reflector assembly 17, may of course be used. Furthermore, more than one ground station may be used with the same reflector assemblies at the same time.

In the arrangements of FIGS. 4 and 5, triangulation techniques may of course be used to more closely locate a disturbance.

Figure 6:
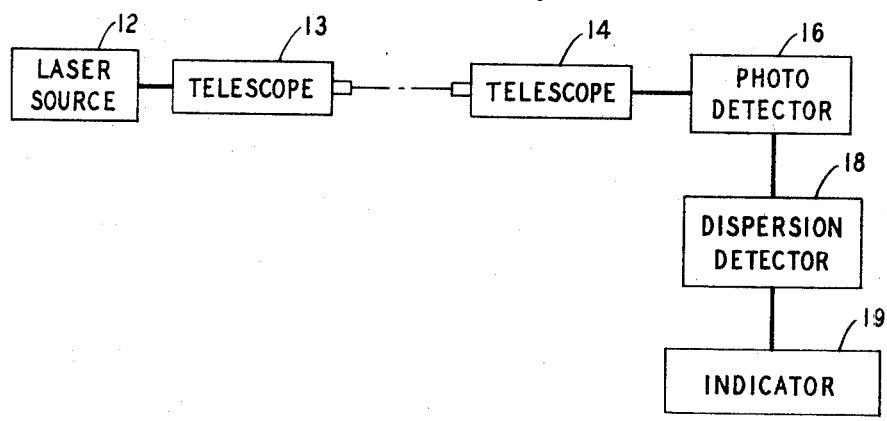
FIG. 6 is a block diagram of another embodiment of the invention.

The invention has been described thus far with the transmitting, receiving and processing apparatus at the same location and a reflecting assembly at a second location. Embodiments of the invention may take other forms. One such form is disclosed in FIG. 6 where the transmitting apparatus, comprising laser source 12 and telescope 13, is at one location and the receiving and processing apparatus, comprising telescope 14, detectors 16 and 18 and indicator 19, is at a second location. Tracking assemblies are not shown but of course may be used to properly align the apparatus at the two locations. Furthermore, it should be noted that a reflecting assembly is not used in this embodiment. Operation of this embodiment is substantially the same as that of FIG. 1.

While several embodiments of the invention have been described, it is to be understood that various other embodiments may be devised by those skilled in the art without departing from the spirit and scope of the invention.

What is claimed is:

1. In combination:
   means for transmitting a laser beam through the atmosphere, and
   means for receiving and processing at least a portion of said beam,
   said last mentioned means comprising:
   an optical detector responsive to said portion of said beam,
   two narrow bandpass filters centered at different frequencies and each responsive to said optical detector output,
   a ratio detector responsive to the outputs of said filters for producing an output having a value related to the spectral density of the output of said optical detector, and
   indicating means responsive to said ratio detector output.

2. In combination:
   means for transmitting a laser beam through the atmosphere, and
   means for receiving and processing at least a portion of said beam,
   said last mentioned means comprising:
   an optical detector responsive to said portion of said beam,
   at least three narrow bandpass filters each responsive to said optical detector output and centered at different frequencies so that when viewed in frequency arranged order there are substantially equal frequency differences between adjacent filters,
   at least two ratio detectors connected to respective pairs of said filters where a filter may be in two pairs and each of said pairs comprises filters having center frequencies differing by said frequency difference,
   averaging means to average the outputs of said ratio detectors for producing an output having a value related to the spectral density of the output of said optical detector and indicating means responsive to said averaging means output.

3. In combination:

first means for transmitting a laser beam and, furthermore, for receiving and processing at least a portion of said beam when reflected back to said first means, and second means for reflecting at least a portion of said laser beam back to said first means, said first means comprising, for processing purposes:
- an optical detector responsive to the received portion of said beam,
- two narrow bandpass filters centered at different frequencies and each responsive to said optical detector output,
- a ratio detector responsive to the outputs of said filters for producing an output having a value related to the spectral density of the output of said optical detector, and
- indicating means responsive to said ratio detector output.

4. In combination:

first means for transmitting a laser beam and, furthermore, for receiving and processing at least a portion of said beam when reflected back to said first means, and second means for reflecting at least a portion of said laser beam back to said first means, said first means comprising, for processing purposes:
- an optical detector responsive to the received portion of said beam,
- at least three narrow bandpass filters each responsive to said optical detector output and centered at different frequencies so that when viewed in frequency arranged order there are substantially equal frequency differences between adjacent filters,
- at least two ratio detectors connected to respective pairs of said filters where a filter may be in two pairs and each of said pairs of filters comprises filters having center frequencies differing by said frequency difference, and
- averaging means to average to the outputs of said ratio detectors for producing an output having a value related to the spectral density of the output of said optical detector, and indicating means responsive to said averaging means output.

5. A combination in accordance with claim 3 or 4 in which said first means is located in an aircraft and said second means comprises a plurality of laser beam reflecting means placed at spaced intervals along the surface of the earth.

6. A combination in accordance with claim 3 or 4 in which said first means is located on the surface of the earth and said second means comprises at least one laser beam reflecting means in orbit about the earth so as to pass over said first means.

References Cited

UNITED STATES PATENTS 2,964,640    12/1960    Wippler _____ 356—208

OTHER REFERENCES

Subramanian et al.: "Modulation of Laser Beams by Atmospheric Turbulence," B.S.T.J. Briefs, March 1965, pp. 543–6.

Paulsen: "Investigation of Techniques for Detecting Clear Air Turbulence," Proc. Nat'l Air Meeting on CAT, Feb. 23–24, 1966, pub. by SAE, pp. 51–54.

Atlas et al.: "Optimizing the Radar Detection of CAT," same proc. as in ref. No. 2, pp. 97–106.

Breece et al.: "Remote Measurement of Differential Atmospheric Velocity," same proc. as ref. No. 2, pp. 135, and 152–155.

Subramanian et al.: "Modulation of Laser Beams by Atmospheric Turbulence-Depth of Modulation," B.S.T.J., March 1967, pp. 623–629, and 646–648.

Reiter: "The Problem of CAT: Possible Future Developments," Astronaut. & Aeronaut. 5, August 1967, pp. 56–58.

Lang et al.: "Continuous Wave Laser Ground-to-Space-to-Ground Laser Experiment," Appl. Optics, 6, (9), September 1967, p. 1579.

RONALD L. WILBERT, Primary Examiner

R. J. WEBSTER, Assistant Examiner

U.S. Cl. X.R.

73—147; 324—79; 343—5